(12) United States Patent
Kuo et al.

(10) Patent No.: US 8,312,983 B2
(45) Date of Patent: Nov. 20, 2012

(54) APPARATUS FOR STACKING ELECTRODE PLATES

(76) Inventors: Lung Kuo, Taipei (TW); Chia-Shou Kuo, Taipei (TW)

( * ) Notice: Subject to any disclaimer, the term of this patent is extended or adjusted under 35 U.S.C. 154(b) by 75 days.

(21) Appl. No.: 12/984,113

(22) Filed: Jan. 4, 2011

(65) Prior Publication Data
US 2011/0259712 A1    Oct. 27, 2011

(30) Foreign Application Priority Data

Apr. 23, 2010    (TW) ............................... 99207499 U

(51) Int. Cl.
*B65G 47/46*    (2006.01)
(52) U.S. Cl. ................. 198/435; 198/369.2; 108/106
(58) Field of Classification Search ............... 198/369.2, 198/435, 436, 445; 271/9.01; 209/650; 270/52.08, 270/52.22, 58.13, 58.28; 211/1.52, 1.57; 108/106
See application file for complete search history.

(56) References Cited

U.S. PATENT DOCUMENTS

| | | | | |
|---|---|---|---|---|
| 3,187,880 A * | 6/1965 | Frater et al. | .................... | 198/798 |
| 4,329,928 A * | 5/1982 | Shaw | ............................ | 108/106 |
| 5,009,303 A * | 4/1991 | Lutzke | ....................... | 198/347.3 |
| 5,078,255 A * | 1/1992 | Haley | ............................ | 198/358 |
| 5,692,593 A * | 12/1997 | Ueno et al. | .................. | 198/369.2 |
| 5,810,149 A * | 9/1998 | Sandberg et al. | .......... | 198/369.2 |
| 5,909,796 A * | 6/1999 | Soldavini | .................... | 198/369.2 |
| 6,227,377 B1 * | 5/2001 | Bonnet | .......................... | 209/650 |
| 6,238,175 B1 * | 5/2001 | Gotz et al. | ..................... | 414/795 |
| 6,279,721 B1 * | 8/2001 | Lyngso et al. | ............. | 198/369.2 |
| 6,390,278 B1 * | 5/2002 | Brown | ........................ | 198/463.3 |
| 6,457,705 B2 * | 10/2002 | Nanba et al. | ................ | 270/58.12 |
| 6,523,668 B2 * | 2/2003 | Wolz | ............................ | 198/369.2 |
| 6,592,113 B1 * | 7/2003 | Asao | ........................... | 270/58.07 |
| 6,708,813 B2 * | 3/2004 | Takahashi | ................... | 198/369.2 |
| 7,547,184 B2 * | 6/2009 | Dall'Omo et al. | ............ | 414/791 |
| 7,946,797 B2 * | 5/2011 | Smith | ....................... | 414/331.09 |
| 8,079,457 B2 * | 12/2011 | Heinz | ............................ | 198/435 |

* cited by examiner

*Primary Examiner* — Douglas Hess
(74) *Attorney, Agent, or Firm* — Rabin & Berdo, P.C.

(57) ABSTRACT

An apparatus for stacking electrode plates includes a first and second transfer conveyor units, and an electrode plate support. The first transfer conveyor unit includes an addressing conveyor and a movable conveyor, and a power unit drives the movable conveyor upward and downward to vary the angle between the movable conveyor and the addressing conveyor. The second transfer conveyor unit has a plurality of conveyors located at different heights. The electrode plate support has a plurality of support plates which are placed vertically parallel to one another. The electrode plate support is moved upward and downward in a vertical direction via a conveyor device to move the support plates to positions adjacent to their own corresponding conveyors of the second transfer conveyor unit at different heights, and each of the support plates accepts an electrode plate from its own corresponding conveyor of the second transfer conveyor unit.

4 Claims, 6 Drawing Sheets

APPARATUS FOR STACKING ELECTRODE PLATES

BACKGROUND OF THE INVENTION

1. Field of the Invention

The present invention relates to an apparatus for stacking electrode plates, which can automatically and quickly stack the electrode plates for batteries.

2. The Prior Arts

The conventional sealed lead-acid batteries have the following shortcomings:

(1) The gird is made by pouring molten lead ingots into a mold, and however, material consumption is relatively high by using this process.
(2) If the electrode plates are vertically arranged, the electrolyte stratification will occur.
(3) The electrode plates are secured in place by the fixing rods located on the two sides of the electrolysis tank, and however, the active substances of the electrode plates easily drop off due to impact and vibration.
(4) The manufacturing processes involve repeatedly drying and maturing steps so that it requires a longer period to complete the processes, and the longer period delays the capital flow and increases the waiting period of the products in the market.
(5) The grid is made of solid lead alloy, and the lead ingots for the proper series and/or parallel connections of the electrodes are required, and thereby material consumption is relatively high.
(6) Lead vapor is released in the process of melting lead ingots, which can pollute the environment when ventilation is not adequate.
(7) The ratio of the energy output of a battery to its weight (33 wh/kg) is low, and the battery cycle life is only about 300 cycles due to the anti-vibration structure of the battery, and the battery charge time is too long which requires about 6 to 8 hours.

The horizontal lead-acid batteries are developed for improving the shortcomings of the conventional vertical batteries. Strings of glass fiber are wrapped into a core of a horizontally lead-acid battery, and a layer of lead alloy is coated on the outside of the core by cold extrusion to form a lead string. The lead strings are then woven into a lead grid. A new lead paste is produced without the maturity stage, and the positive electrode and the negative electrode lead pastes are respectively coated on the lead grid according to the desired battery structure. In order to secure the active substances on the electrode plates, a sheet of specific paper is attached to the two sides of the electrode plate, and then dried and wrapped with the specific fine glass cottons, and then the electrode plates are assembled and used in a lead acid battery. The lead acid battery is then sealed, followed by filling acid, forming, filling curing agent, cleaning and packing. After that, the process for manufacturing the horizontal lead acid battery is completed.

Because the electrode plates are horizontally arranged, the concentration polarization, which is due to the concentration difference which develop at the anode and cathode during electrolysis, can be eliminated, and the concentration polarization is one of the main reasons why the capacity and the lifetime of the batteries are reduced.

The internal resistance of the horizontal lead acid batteries is small because the positive and negative electrodes are directly in contact with each other so that the active substance can be used uniformly. The lead ingots used for connecting batteries in parallel are saved. The high current electrical discharge and voltage drop become small.

The lead net replaces the conventional grid so that the weight of the batteries is reduced, and the material consumption is relatively low. The ratio of the energy output of a battery to its weight (40 wh/kg) is greatly increased, and the charge acceptance of lead acid battery is increased so that the charging time is shortened.

Because the lead net has good tensile strength, the active substances on the electrode plates can allow large strain deformation, and thereby the battery cycle life is increased.

The surface of the electrode plate is chemically activated by acid dipping, wherein the lead grids of the electrode plates have been pasted with the positive electrode paste and the negative electrode paste. Conventionally, the electrode plates are arranged on the electrode plate support one by one manually, and then the electrode plate support with the electrode plates is immersed into an acid for a period of time. The electrode plate support with the electrode plates is then taken out from the acid for the next step of drying the electrode plates. However, the efficiency to arrange the electrode plates on the electrode plate support one by one manually is too low.

SUMMARY OF THE INVENTION

A primary objective of the present invention is to improve the low efficiency for arranging the electrode plates on the electrode plate support one by one manually before acid dipping.

The apparatus for stacking electrode plates of the present invention comprises a first transfer conveyor unit having an addressing conveyor and a movable conveyor, and a power unit drives the movable conveyor upward and downward so as to vary an angle between the movable conveyor and the addressing conveyor; a second transfer conveyor unit having a plurality of conveyors located at different heights; and an electrode plate support having a plurality of support plates which are parallel to one another in a vertical direction, the electrode plate support is moved upward or downward in a vertical direction via a conveyor device so as to move the support plates to the positions adjacent to their own corresponding conveyors of the second transfer conveyor unit at different heights, and each of the support plates at different heights accepts an electrode plate from its own corresponding conveyor of the second transfer conveyor unit.

The power unit can be a pneumatic cylinder or a hydraulic cylinder, and the movable conveyor can be moved upward and downward via the power unit so as to vary an angle between the movable conveyor and the addressing conveyor.

The positions and angles of the movable conveyor can be controlled by using a control device which includes a servo motor and an angle-positioning mechanism.

The electrode plate support includes a plurality of posts, and each post has a plurality of grooves which are located in parallel to one another in a vertical direction and face to the same direction, and the support plates have lugs which are engaged with the grooves such that the support plates are supported by the posts.

The electrode plate support includes an upper base and a lower base, and the posts are fixed between the upper and lower bases. Each of the posts has a first through hole which extends through the grooves, and each of the lugs of the support plates has a second through hole which is aligned with the first through hole. A rod extends through the aligned first and second through holes to fix the support plate to the post so that the electrode plate support is completed.

The electrode plate support has a hanging bracket located above the electrode plate support.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
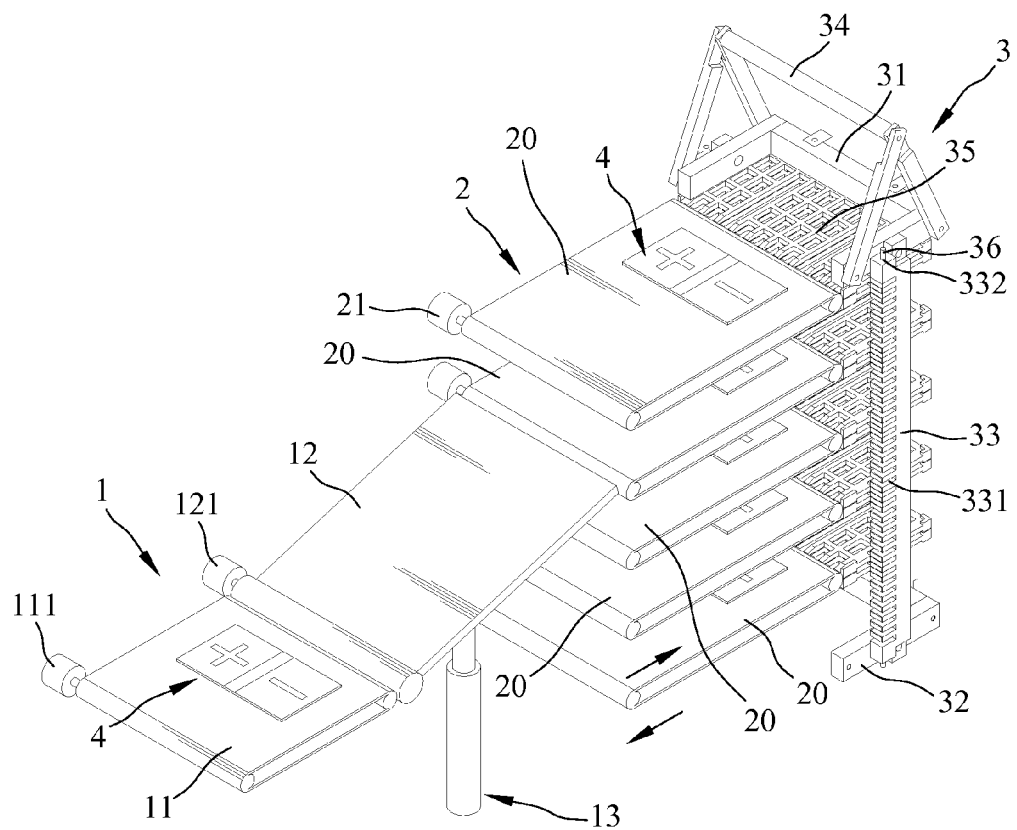
FIG. 1 is a perspective view showing the apparatus for stacking electrode plates in accordance with the present invention.
Figure 6:
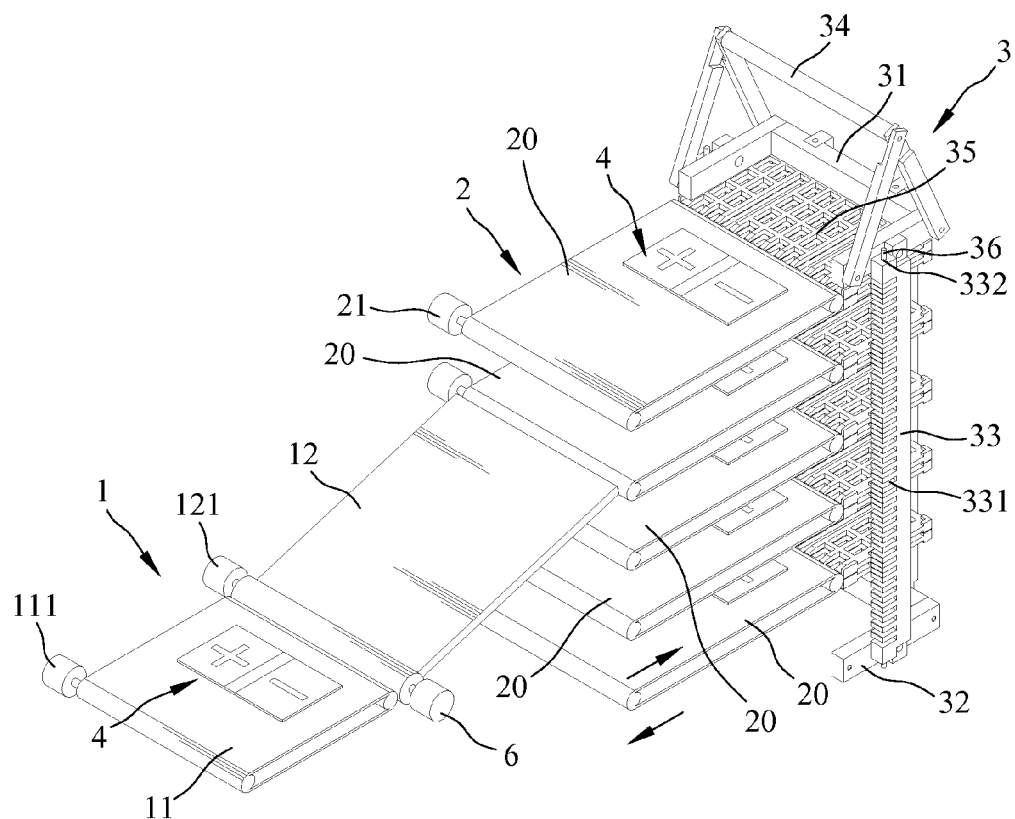
FIG. 6 shows another embodiment of the apparatus for stacking electrode plate in accordance with the present invention.

With reference to the drawings and in particular to FIG. 1, an apparatus for stacking electrode plates according to the present invention comprises a first transfer conveyor unit 1, a second transfer conveyor unit 2, and an electrode plate support 3. The first transfer conveyor unit 1 comprises an addressing conveyor 11 and a movable conveyor 12 which is located at the output end of the first transfer conveyor unit 1. The addressing conveyor 11 can be a conveyor belt which is driven by a first motor 111, and the movable conveyor 12 can be a conveyor belt driven by a second motor 121. The movable conveyor 12 has one end that is adjacent to the addressing conveyor 11 and is pivotably connected to the ground, and a power unit 13 is connected to the proper position at the underside of the movable conveyor 12. The power unit 13 drives the movable conveyor 12 upward or downward so as to vary the angle between the movable conveyor 12 and the addressing conveyor 11. The power unit 13 can be a pneumatic cylinder or a hydraulic cylinder by which the movable conveyor 12 can be moved upward or downward to a specific angle of the movable conveyor 12 inclination. The power unit 13 can also be a control device 6 as shown in FIG. 6, and includes a servo motor and an angle positioning mechanism. The servo motor drives the movable conveyor 12 upward or downward, and the angle positioning mechanism can set the movable conveyor 12 to a desired inclination angle relative to the addressing conveyor 11.

The second transfer conveyor unit 2 comprises a plurality of conveyors 20 respectively located at different heights, and the conveyors 20 are horizontally placed, and the conveyors 20 can be the conveyor belts driven by a third motor 21.

Preferably, the first, second and third motors 111, 121, 21 are servo motors.

Figure 4:
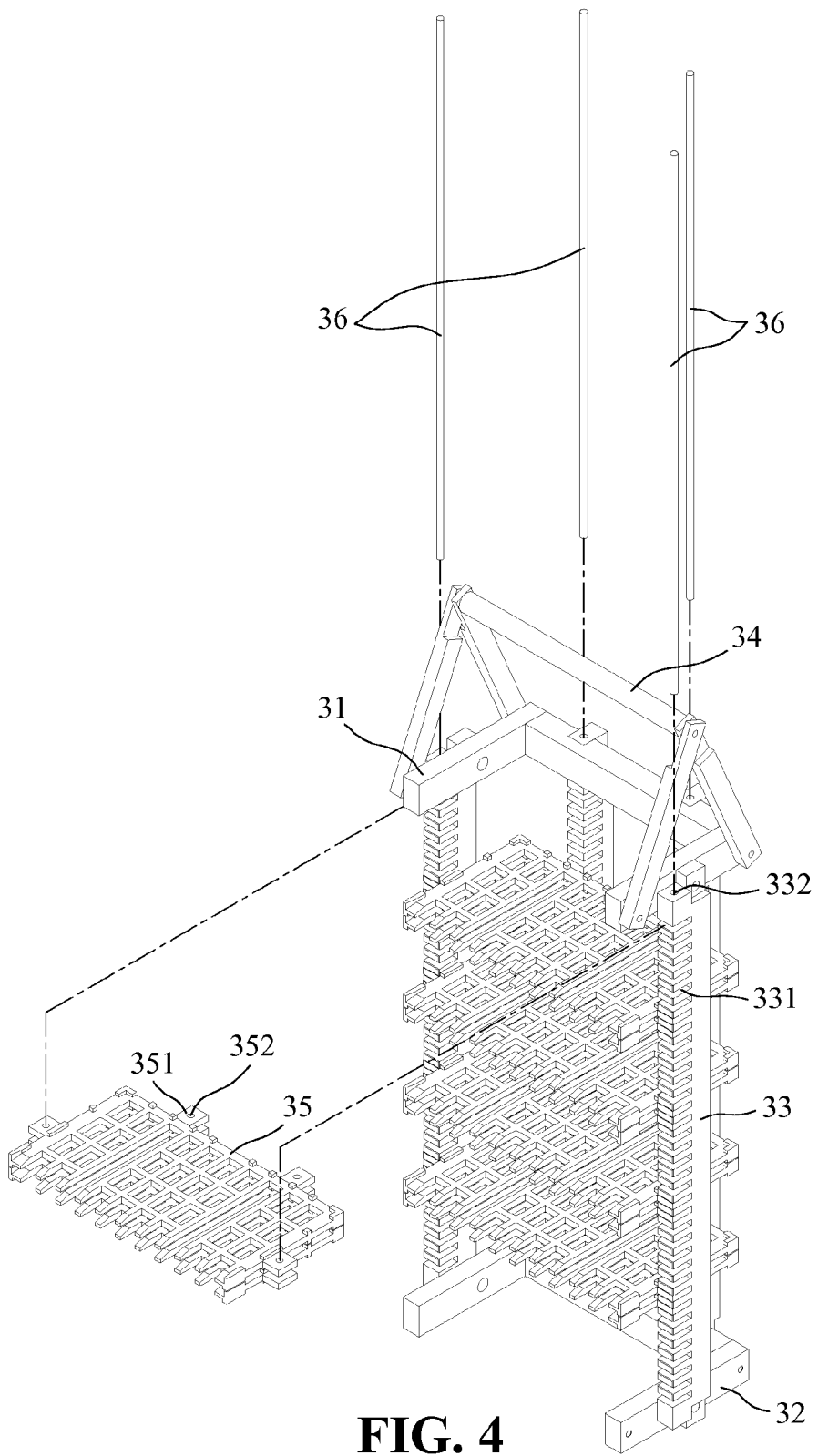
FIG. 4 is an exploded view to show the electrode plate support of the apparatus for stacking electrode plates of the present invention.
Figure 5:
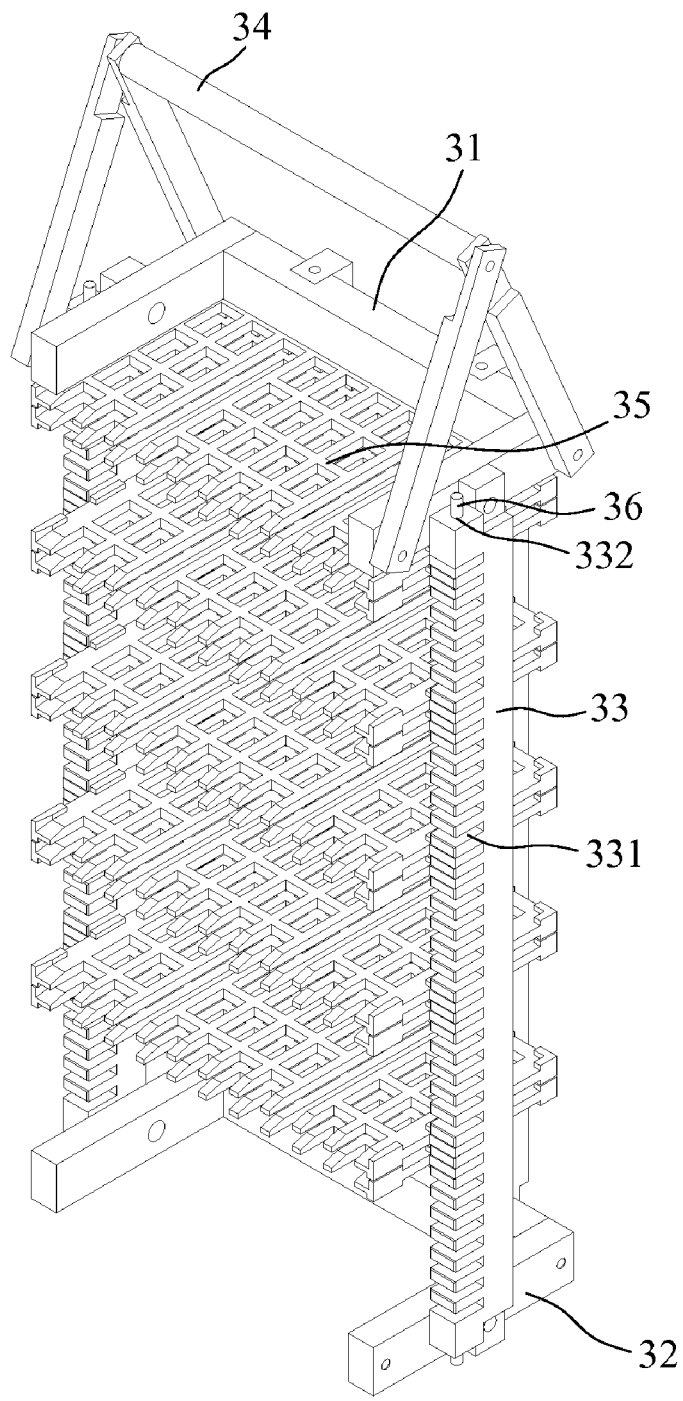
FIG. 5 is a perspective view showing the electrode plate support of the apparatus for stacking electrode plates in accordance with the present invention.

As shown in FIG. 4, the electrode plate support 3 comprises a frame body and a plurality of support plates 35, wherein the frame body includes an upper base 31, a lower base 32, and the posts 33 are fixed between the upper and lower bases 31, 32. In this embodiment, the upper and lower bases 31, 32 are in the U shape, and the posts 33 are parallel to one another in the vertical direction on two sides and the rear side of the U-shaped upper and lower bases 31, 32. Each post 33 has a plurality of grooves 331 which are aligned parallel to one another in the vertical direction and face to the same direction. The posts 33 each has at least one first through hole 332 which extends through the grooves 331 in the vertical direction, and a hanging bracket 34 is arranged above the upper base 31. The support plate 35 is preferably a plate with a plurality of holes, and has a plurality of lugs 351 in its peripheral portion, and the lugs 351 is arranged corresponding to the grooves 331 of the posts 33. Each lug 351 has a second through hole 352 which is arranged corresponding to the first through hole 332, wherein the first through hole 332 and the second through hole 352 are aligned. The lugs 351 are engaged with the grooves 331. A rod 36 is inserted through the aligned first and second through holes 332, 352 to fix the support plates 35 to the post 33, and the support plates 35 are supported by the posts 33 as shown in FIG. 5.

Figure 2:
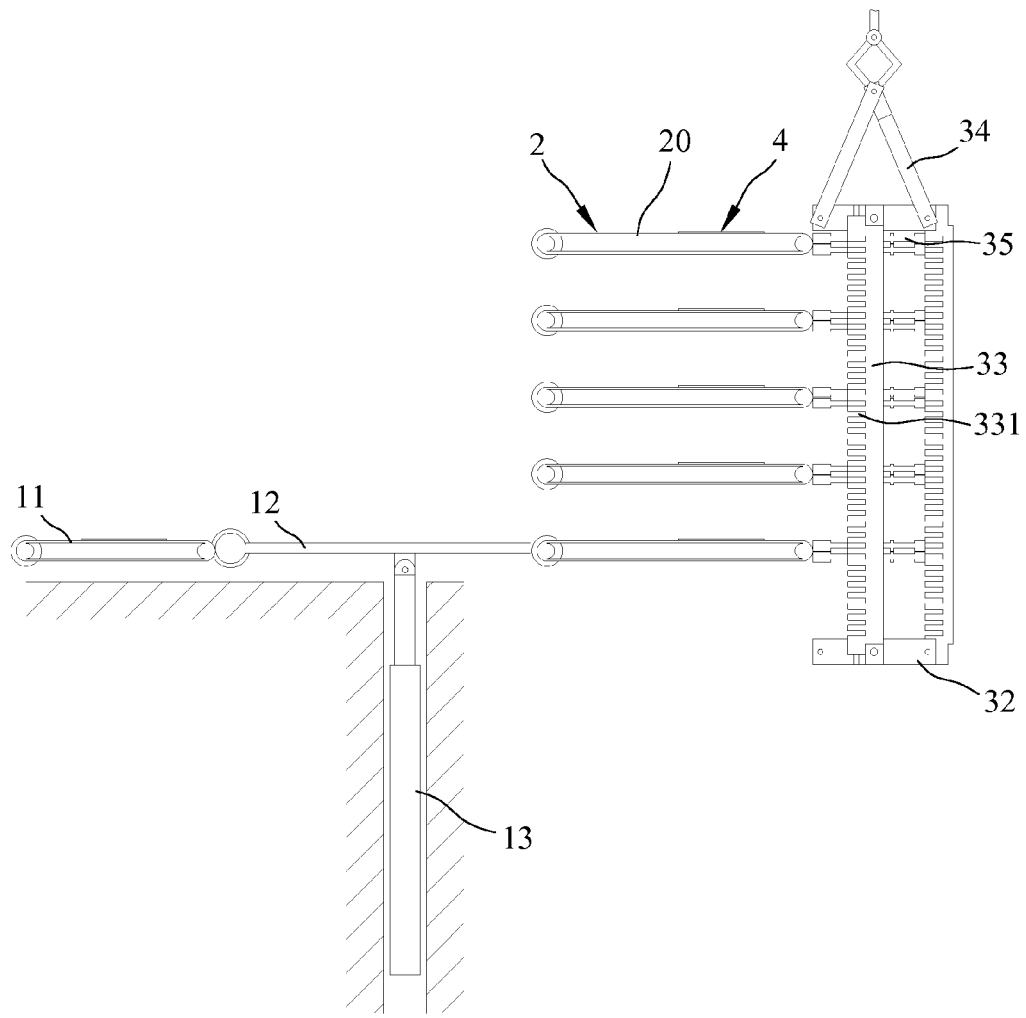
FIG. 2 shows that the first transfer conveyor unit sends the electrode plates to the conveyors above the second transfer conveyor unit.
Figure 3:
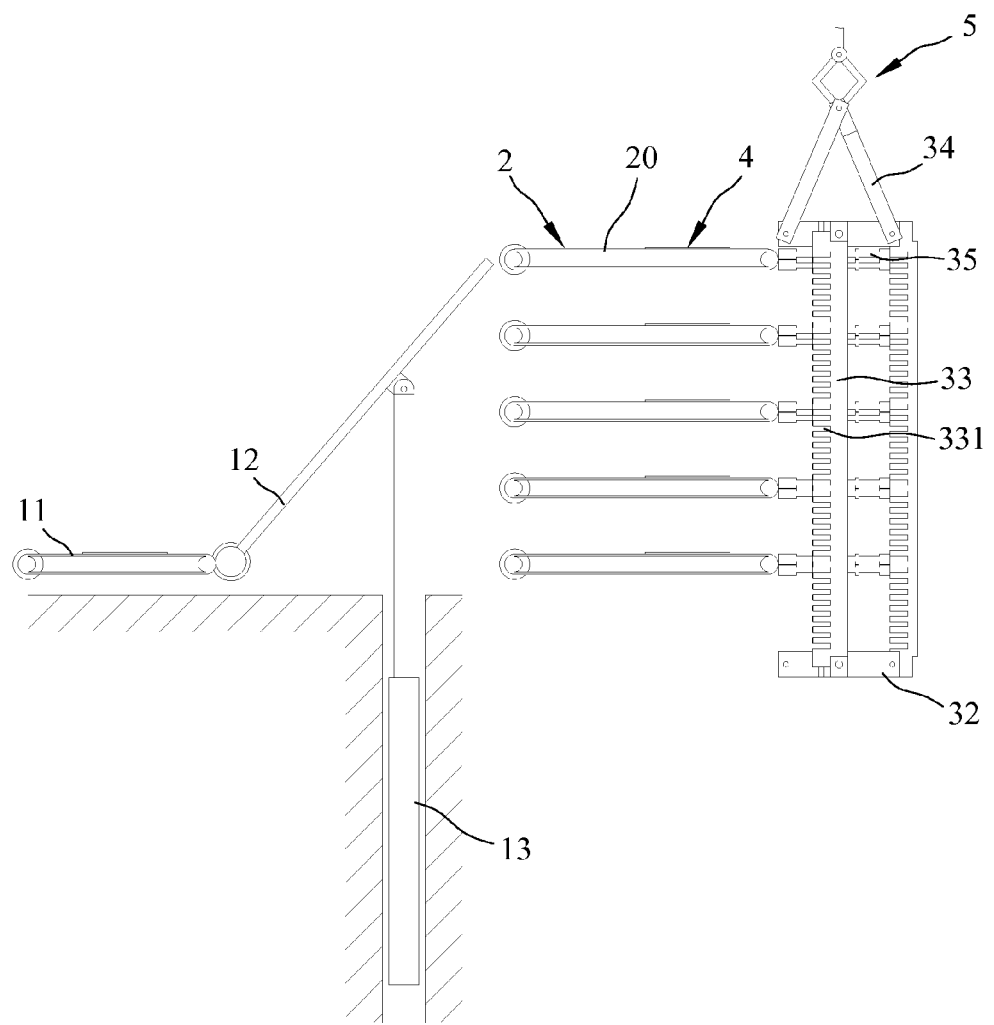
FIG. 3 shows that the first transfer conveyor unit sends the electrode plates to the conveyors beneath the second transfer conveyor unit.

As shown in FIGS. 2 and 3, the first and second transfer conveyor units 1, 2 are fixed at the desired positions, and the movable conveyor 12 of the second transfer conveyor unit 2 is sequentially pivoted upward and downward by the power unit 13 according to the setting values calculated by computer program so that the output ends of the movable conveyor 12 are located corresponding to the input end of one of the conveyors 20 of the second transfer conveyor unit 2. The hanging bracket 34 is clamped and moved upward and downward by the conveyor device 5 so that some of the support plates 35 fixed in the electrode plate support 3 are located corresponding to the output end of the conveyors 20 at different heights. The electrode plate support 3 is controlled to move upward and downward in the vertical direction by the conveyor device 5 so that the support plates 35 can be adjusted to be located at the output end of the conveyors 20 at different heights. When stacking the electrode plates 4, the first, second and third motors 111, 121, 21 are activated simultaneously, and the operators put the electrode plates 4 on the addressing conveyor 11 which delivers the electrode plates 4 to the movable conveyors 12. When the output end of the movable conveyor 12 is moved to a position corresponding to one of the conveyors 20, the electrode plates 4 are transferred to the conveyor 20 which delivers the electrode plates 4 to the corresponding support plates 35. During the operation, the third motor 21 is not activated at the beginning, and the movable conveyors 12 is pivoted upward and downward by the power unit 13 so that the electrode plates 4 are sequentially and respectively sent to the corresponding conveyors 20 at different heights, and the third motor 21 is then activated by program setting or by a detector so that each of the electrode plates 4 is simultaneously delivered to its corresponding support plate 35 at different height. Then, the electrode plate support 3 is moved upward or downward by the conveyor device 5 so that the support plates 35 without accepting the electrode plates 4 last time can be moved to the positions adjacent to their own corresponding conveyors 20 of the second transfer conveyor unit 2, and each of the support plates 35 moved to the positions adjacent to their own corresponding conveyors 20 can accept an electrode plate 4 of the next batch from the conveyors 20. Therefore, the process for stacking electrode plates in the present invention is automatic and very efficient. After the electrode plates 4 are stacked on the electrode plate support 3, the whole electrode plate support 3 is moved by the conveyor device 5 to a place for acid dipping.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An apparatus for stacking electrode plates, comprising
a first transfer conveyor unit having an addressing conveyor and a movable conveyor, a power unit driving the movable conveyor upward and downward so as to vary an angle between the movable conveyor and the addressing conveyor;
a second transfer conveyor unit having a plurality of conveyors located at different heights; and
an electrode plate support having a plurality of support plates which are parallel to one another in a vertical direction, the electrode plate support being moved upward or downward in the vertical direction via a conveyor device so as to move the support plates to positions adjacent to their own corresponding conveyors of the second transfer conveyor unit at different heights, and each of the support plates at different heights accepting an electrode plate from its own corresponding conveyor of the second transfer conveyor unit, the electrode plate support further including a plurality of posts, each post having a plurality of grooves which are located in parallel to one another in the vertical direction and face to the same direction, the support plates having lugs which are engaged with the grooves such that the support plates are supported by the posts.

2. The apparatus as claimed in claim 1, wherein the electrode plate support includes an upper base and a lower base, and the posts are fixed between the upper and lower bases.

3. The apparatus as claimed in claim 1, wherein each of the posts has a first through hole which extends through the grooves, and each of the lugs of the support plates has a second through hole which is aligned with the first through hole, and a rod is inserted through the aligned first and second through holes to fix the support plates to the post.

4. The apparatus as claimed in claim 1, wherein the electrode plate support has a hanging bracket located above the electrode plate support.

* * * * *